United States Patent

[11] 3,609,023

[72] Inventors Jean Turboult;
Marcel Morion, both of Paris, France
[21] Appl. No. 738,890
[22] Filed June 21, 1968
[45] Patented Sept. 28, 1971
[73] Assignee CSF-Compagnie Generale de Telegraphie Sans Fil
[32] Priority June 29, 1967
[33] France
[31] 112,498

[54] HEADUP DISPLAY SYSTEMS FOR AIRCRAFT PILOTING
7 Claims, 7 Drawing Figs.
[52] U.S. Cl. .................................................. 353/13,
353/84, 40/130 R, 240/73 R
[51] Int. Cl. ........................................................ G03b 21/00
[50] Field of Search ........................................... 353/13, 14,
84; 40/130; 240/8.16, 73; 340/366.3, 381

[56] References Cited
UNITED STATES PATENTS
| | | | |
|---|---|---|---|
| 2,127,887 | 8/1938 | Rayburn | 340/366.3 X |
| 2,707,733 | 5/1955 | Steinharter | 240/73 X |
| 2,890,538 | 6/1959 | Jentges | 40/130 |
| 2,988,738 | 6/1961 | Baker | 340/381 |

*Primary Examiner*—William D. Martin, Jr.
*Attorney*—Cushman, Darby & Cushman

ABSTRACT: A lighting arrangement for illuminating reticles in a headup display system comprises a hollow shaft having opaque walls and fixed to a movable assembly controlled in position, the reticle being formed in an end wall of this shaft, and a lampholder slidably mounted in this shaft for carrying plugin bulbs inside this shaft. This arrangement also comprises a translucent body between the bulbs and the reticle and printed circuits plugged into the lampholder for supplying the bulbs. A colored filter may be positioned between the reticle and the bulbs or in front of the reticle.

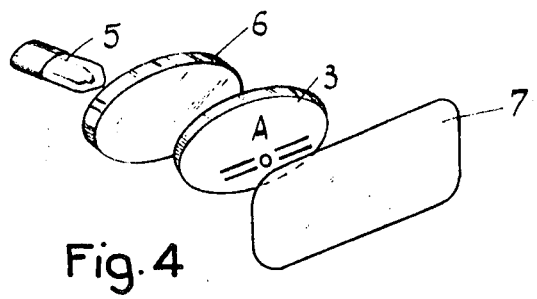
Fig. 4
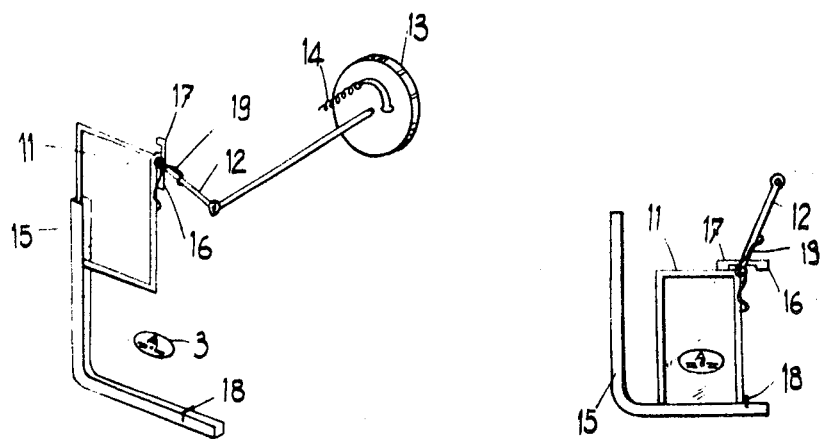
Fig. 5
Fig. 6
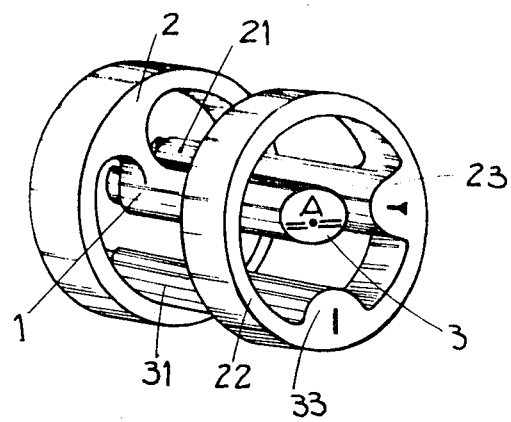
Fig. 7

HEADUP DISPLAY SYSTEMS FOR AIRCRAFT PILOTING

The present invention relates to headup display systems used on the aircraft for assisting the pilot by representing within the field of vision outside the aircraft, a plurality of luminous markers controlled in position and projected at infinity.

The luminous image thus displayed, together with objects outside the aircraft, provides the pilot with the information he needs for controlling the aircraft.

A headup display system of this kind must furnish to the pilot a number of important information items while at the same time minimizing the effort required on the part of the pilot to read and interpret the information thus made available.

The displaying of these different pieces of information has hitherto been effected either successively or by adapting the form of the reticles to accord with the kind of information displayed. In the first case, however, lack of simultaneity in the provision of flight information items, is a drawback.

In the second case, in order to interpret the information displayed the pilot has to carry out a mental exercise which is prejudicial to fast reactions, especially in cases where the prevailing flight conditions are difficult.

It is an object of the invention to overcome these drawbacks by displaying differently colored symbols corresponding to different information items and by arranging for the color of certain of these symbols to change in accordance with external lighting conditions.

According to the invention there is provided a lighting arrangement for illuminating a reticle in a headup display system, used in an aircraft for projecting at infinity in front of the pilot the luminous images of reticles for providing him with the information corresponding to the aircraft flight, each reticle being mounted on a movable assembly controlled in position, said arrangement comprising: a hollow shaft having opaque lateral walls and one opaque end wall, fixed to said assembly, said reticle being formed in said end wall; a lampholder slidably mounted in said hollow shaft at least one lamp supported by said lampholder inside said shaft, a translucent body for diffusing the light emitted by said lamp, said body being arranged between said lamp and said reticle; and means associated with said lampholder for connection of said lamp to a source.

For a better understanding of the invention, and to show how the same may be carried into effect, reference will be made to the drawing accompanying the ensuing description and in which.

Figure 1:
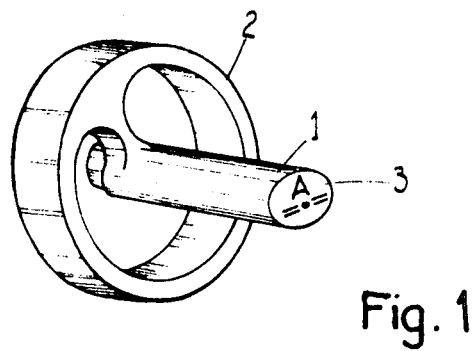
FIG. 1 shows in perspective the device according to the invention for illuminating in color a reticle.
Figure 2:
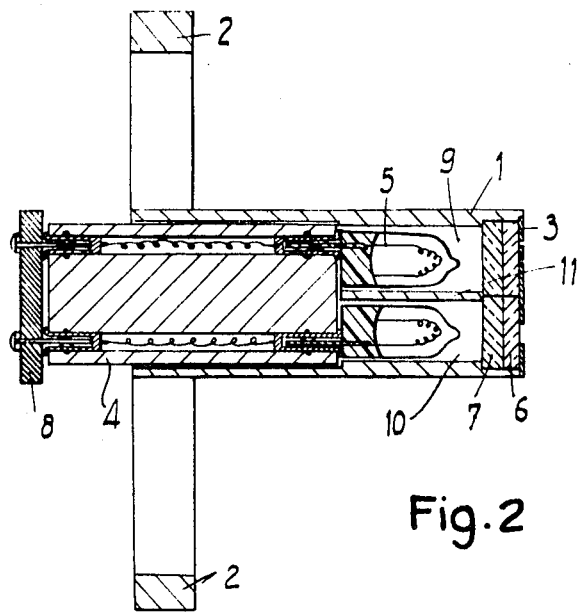
FIG. 2 is a sectional view of the device of FIG. 1.

FIG. 4 schematically illustrates a modification of the device of FIGS. 1 and 2;

FIGS. 5 and 6 illustrate a further modification; and

FIG. 7 illustrates one application of the device in accordance with the invention.

As is well known in the art, a headup display system of the kind considered comprises in front of the pilot of an aircraft a semireflecting glass disposed at 45° from the longitudinal axis of the aircraft and from the optical axis of a collimator lens which makes it possible to project at infinity in front of the pilot the luminous images of reticles giving to the pilot the information items he needs for piloting the aircraft. In view of the number of reticles which are necessary, an optical mixing system (such as system of prisms) is disposed before the collimator lens and the reticles are positioned before the different input faces of this mixing system.

FIG. 1 illustrates a lighting device by means of which, in accordance with the invention, the reticles of a headup display system can be illuminated with colored light.

The device in accordance with the invention comprises a hollow shaft 1 and cylindrical from in the base of which is formed the reticle 3 which is to be illuminated. The shaft 1 is attached to the inner side of a bushing 2 which is mounted with a practically zero clearance into a bearing (not shown) and is driven by a suitable control system to reproduce a given information corresponding to the aircraft flight as is known. FIG. 2 illustrates a section through the device shown in FIG 1.

The hollow shaft 1 is opaque. At its end, in which the reticle 3 is formed, a colored filter 7 and a translucent body 6, placed against the reticle in order to diffuse the light and achieve uniform illumination, are arranged. The filter mentioned may for example be an opaline glass or even a conventional ground glass.

A lamp holder 4, having the same shape as the shaft 1, is placed therein. It carries miniature plugin lamps 5 (only one is shown) which are placed in the compartments 9 and 10 within the shaft and illuminate the respective two parts of the reticle 3. An opaque partition 11 separates the two compartments from each other so that the two parts of the reticle are independently illuminated, and the colored filter may be of different colors in the two compartments. At least two lamps per compartment will be used with independent supplies, for obvious reasons of safety. The supply can be effected through the medium of a printed circuit 8 which connects the flexible leads and the different lamps, this circuit being, for example, plugged into the lampholders. Thanks to this device, in which the light sources are associated with the reticle, uniform illumination of the reticle by sources of very small size and low power is obtained, something which would be impossible if fixed sources were to be used, which would then have to illuminate the whole of the display range of the reticle.

Figure 3:
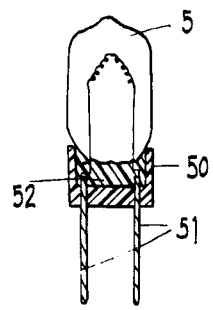
FIG. 3 illustrates a lamp used in the device according to the invention.

For these miniaturized devices, the lamp illustrated in FIG. 3 can be employed. It comprises a miniature bulb 5 with connections for soldering. In order to facilitate replacement of these lamps in the aforedescribed device, they are of plugin design so that no soldering operations are needed and therefore there is no risk of the precision miniaturized mechanism being damaged by solder splashes. The connections of the bulb 5 are spaced by a desire interval (for example 2 mm. in the case of a 3 mm. diameter lamp) then soldered to the conductive pins 51 which will for example be gilded in order to ensure good electrical contact. These pins are sufficiently stiff to support the lamp. A collar 50 of insulating material, for example Teflon, comprising holes in which the pins are mounted, is stuck to the lamp by means of a sealing adhesive 52, for example a synthetic resin which may be polymerized.

FIG. 4 illustrates another possible arrangement of the device according to the invention.

The translucent body 6 is in contact with the reticle 3 but the colored filter 7 is located in front of the reticle. This filter must then be of optically polished flat glass. Moreover, it must have a sufficiently large area to cover the whole of the display range of the reticle. This kind of design is advantageous in that the filter does not undergo any heating as a consequence of the proximity of the light sources, in the manner which does occur in the design of FIG. 1, so that a glass can be used which is not particularly strong in the mechanical sense, and the colors may be ones which would run the risk of some instability at high temperatures.

Moreover, this permits easy changing of the reticle color. All that is necessary is to change the filter 7 or simply to remove it if a white light display is wanted.

FIGS. 5 and 6 illustrate an embodiment in which control means are provided for moving a colored filter in front of a white reticle. This may, for example, be desirable in order to match the reticle display to the external light level, for example a blue filter being used at night.

The filter 11 is mounted to rotate at the end of a lever 12 associated with two stops 16 and 17, this lever is moved by means of the two-position control knob 13, the two positions being determined by the spring 14.

The filter 11 slides in a frame 15 and is kept in contact therewith by a spring 19.

If a white reticle 3 is desired the filter 11 is moved into the position in which it is out of service (FIG. 5). is then held by the stop 16 and the frame 15. In the operative position (FIG. 6), the filter 11 abuts the stop 18 of the frame 15 an also abuts the stop 17, so that its position is accurately controlled.

The light loss at the reticle, due to the interposition of the filter 11, is compensated for by the increase in contrast of the display, resulting from illumination with monochromatic light.

FIG. 7 illustrates an interesting application of a device in accordance with the invention, which exploits the small size of the reticle and illumination assembly.

In a headup display system, numerous displays have to be superimposed, and this requires an image mixer several inputs, and also requires that in front of each input a certain number of reticles which rotate about common axes, or otherwise, and which require specific illumination levels, have to be provided.

Due to the very small size of the illumination system, the mechanism of FIG. 7 and be used. A first reticle 3, the flight director, and the marker A, which lights up under certain conditions of use of the flight director, are mounted as indicated in FIG. 1. The reticle 23, which indicates the vertical deviation of the aircraft in relation to the glide path axis produced by the ILS, and the reticle 33, the taxing director, are mounted on the same mounting 22, in front of the mounting 2. The mounting 22, which is in a zero-clearance bearing, it rotated by a single control system, Indeed, information items furnished by the reticles 23 and 33 are never required simultaneously and the control can therefore be derived in the one case from the ILS receiver and in the other from the taxing instructions. Each of the reticles 23 and 33 is associated with a hollow shaft 21 and 31, similar to the shaft 1 and carrying the reticle-illuminating devices. Moreover, the mounting 2 is arranged in a vertical slide, the mounting 22 enabling the reticle 3 to move vertically. Due to this interleaved design, it is possible, without any dismantling, to gain access to the region behind the mounting 2, to the lampholders of the reticles 3, 23, and 33, and yet to keep the size of the mechanism extremely small.

Of course, the invention is not limited to the embodiments described and shown which were given solely by way of example.

What is claimed is:

1. A movable arrangement for illuminating a reticle in a headup display system, used in an aircraft for projecting at infinity in front of the pilot the luminous images of reticles for providing him with the information corresponding to the aircraft flight, (each reticle being mounted on a movable assembly controlled in position,) said arrangement being controlled in position and said reticle being locked with said arrangement, said arrangement comprising: a hollow shaft having opaque lateral walls an one opaque end wall, (fixed to said assembly), said reticle being formed in said end wall; a lampholder slidably mounted in said hollow shaft, said lampholder being suitable for pluging-in at least two lamps; at least two lamps supported by said lampholder, inside said shaft means for selectively lighting different portions of said reticle, said means comprising at least one partition between said lampholder and said end wall for building up at least two separately lightable compartment, each compartment comprising at least one of said lamps, (at least one lamp supported by said lampholder inside said shaft;) a translucent body for diffusing the light emitted by said lamps, said body being arranged between said lamps and said reticle; and means associated with said lampholder for connecting said lamps to a source.

2. An arrangement as claimed in claim 1 further comprising an optical colored filter arranged for said luminous image of said reticle to be colored.

3. An arrangement as claimed in claim 2, wherein said filter is placed inside said shaft between said reticle and said lamps.

4. An arrangement as claimed in claim 2, wherein said filter is placed in front of said reticle and has dimensions at least equal to the dimensions of the display range of said reticle.

5. An arrangement as claimed in claim 4, wherein said filter is removable and means are provided for removing said filter.

6. An arrangement as claimed in claim 1, wherein said lamps are plugin lamps and said lampholder comprises sockets for holding said lamps. &

7. An arrangement as claimed in claim 6, wherein each of said plugin lamps comprises a miniature bulb with connections for soldering, two pins respectively soldered to said connections, and a collar sealed to said bulb and having holes through which said pins extend.